United States Patent [19]

Dimigen et al.

[11] 3,904,462

[45] Sept. 9, 1975

[54] METHOD OF MANUFACTURING ETCHED STRUCTURES IN SUBSTRATES BY ION ETCHING

[75] Inventors: Heinz Dimigen; Ursula Convertini, both of Hamburg, Germany

[73] Assignee: U.S. Philips Corporation, New York, N.Y.

[22] Filed: Nov. 27, 1973

[21] Appl. No.: 419,434

[30] Foreign Application Priority Data

Nov. 29, 1972 Germany ........................... 2258297

[52] U.S. Cl. .................... 156/13; 156/17; 204/38 B; 204/192; 427/57

[51] Int. Cl.[2] .................... C23C 15/00; H01L 21/00

[58] Field of Search ................. 156/2, 5, 13, 17, 18; 204/192, 129.3, 298, 38 B, 38 R; 117/93.1 GD

[56] References Cited

UNITED STATES PATENTS

| | | | |
|---|---|---|---|
| 3,271,286 | 9/1966 | Lepselter | 156/17 |
| 3,615,953 | 10/1971 | Hill | 156/13 |
| 3,661,747 | 5/1972 | Byrnes et al. | 204/192 |
| 3,782,940 | 1/1974 | Ohto et al. | 156/18 |
| 3,791,952 | 2/1974 | Labuda et al. | 204/192 |

*Primary Examiner*—Douglas J. Drummond
*Assistant Examiner*—Jerome W. Massie
*Attorney, Agent, or Firm*—Frank R. Trifari; Leon Nigohosian

[57] ABSTRACT

Etching masks for ion etching which consist of a material which has an etching velocity which is independent of the angle of incidence of the etching ion beam are of advantage in particular when etching deep structures ( > 1 μm) in a substrate of a material having an etching velocity which depends on the angle of incidence of the ion beam. Material of the etching mask: titanium.

7 Claims, 6 Drawing Figures

METHOD OF MANUFACTURING ETCHED STRUCTURES IN SUBSTRATES BY ION ETCHING

Figure 1A:
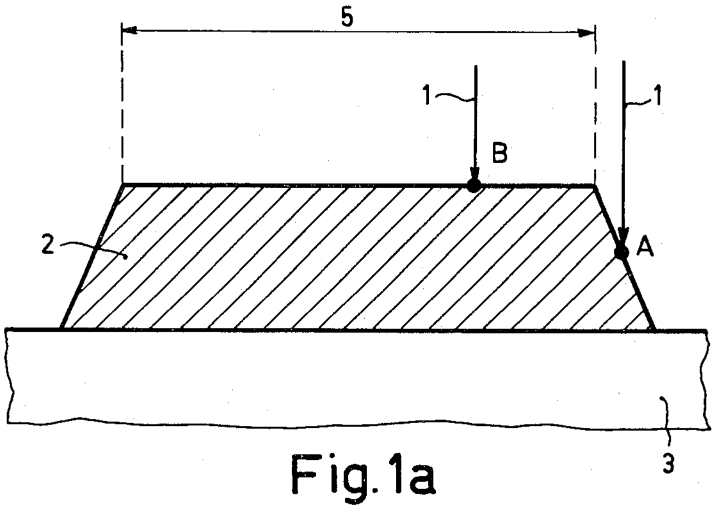

The invention relates to a method of manufacturing etched structures having inclined edge profiles in substrates by ion etching (sputter etching) while using an etching mask.

The removal of material from surfaces of solids which are exposed to a bombardment with energetic ions takes place in that atoms are swung out of a surface layer as a result of atomic impacts in said surface layer caused by the ion bombardment. The velocity with which material is removed from the layer exposed to the ion bombardment depends inter alia upon the energy of the ions, upon the efficiency of the transport of kinetic energy through the body, and upon the direction of incidence of the ion beam. It has been found, that said velocity of removing material may increase when the ion beam is not incident at right angles but at an angle with the normal of the surface on the surface whose material is to be removed, (See A. D. G. Stewart, M. W. Thompson, "Microtopography of Surfaces Eroded by Ion Bombardment," *Journal of Materials Science*, 4 (1969), pp et seq.; G. Wehner, "Influence of the Angle of Incidence on Sputtering Yields," Journal of Applied Physics, 30 (1959), No. 11, pp. 1762 et seq.).

In thin-layer technology, for example, in manufacturing magneto-optical construction elements, it is required to etch desired structures in thin layers (substrates) by means of suitable methods. It is desired that the etched thin layers obtain inclined edge profiles.

It is known (See German patent application No. P.2117199.3) to form an etching mask having inclined edge profiles for an ion etching process by means of a photolacquer film and to provide the desired masking pattern by means of a photolithographic process. The etching of the regions of the substrate to be etched and not covered by the film of photolacquer is then carried out by means of ion etching, that is to say an ion bombardment, in which the edge profile of the etching mask can be reproduced in the substrate to be etched by means of the ion etching process.

Unfortunately, however, the edge profile of the etching mask is not always reproduced identically in the etched substrate. The etching process presents problems when structures having a depth of 1 $\mu$m and more are to be formed. The large increase of the yield (removed particles per incident ion) when the angle of the ion beam with the normal of the surface increases, which increase is observed in many materials and also in photolacquer masks, results in considerable profile deviations of the etched structure relative to the original profile of the etching mask. A considerable inhomogeneity of the etching velocity occurs near the edges which inter alia also results in shrinkage of the profile width of the etched structure relative to the original profile width of the etching mask.

In the first instance this effect is caused in that the ions incident on the inclined edges of the etching mask have a much larger etching velocity than those ions which are incident at right angles.

It is the object of the invention to etch structures by means of ion beams in such manner that the structures formed are identical to those of the etching mask as regards their dimensions.

According to the invention this is achieved in that a material is used for the etching mask in which the yield of removed (sputtered) particles depends to a small extent on the direction of incidence of the ion beam, while the depth of the structures to be etched is adjusted by the layer thickness of the etching mask and by the angle of incidence of the ion beam.

So the invention is based on the recognition of the fact that very particular advantages are obtained for an ion etching process due to the different behaviour of solids with respect to the direction of incidence of energetic ions.

According to a further embodiment of the invention titanium or aluminium oxide is used as a material for the etching mask, the etching process being carried out with an ion beam which is directed at right angles to the substrate to be etched or at an angle with the normal of the surface on the substrate to be etched.

The advantages resulting from the use of the invention consist in that comparatively deep structures can be etched with an etching mask having a comparatively small layer thickness, since the etching mask is removed at a much small etching velocity than the material to be etched. This advantage is the more prominent in particular when the material to be etched itself has an etching velocity which depends considerably on the angle of incidence of the ion beam and when the etching process is carried out with an ion beam which is incident at an angle with the normal of the surface.

A further great advantage is that the edge profile of the etching mask can be reproduced in the substrate to be etched identically and without changes in shape.

An additional important advantage is that etching masks having a small layer thickness can technically be manufactured much more simply than masks having a larger layer thickness when these are provided by cathode sputtering.

The use of titanium or of aluminium oxide as a material for an etching mask has the particular advantage that titanium is not only characterized in that the yield of particles removed by sputtering depends to a small extent on the angle of incidence of the ions, but in addition has a low etching velocity, which generally is desired for mask materials.

Figure 1B:
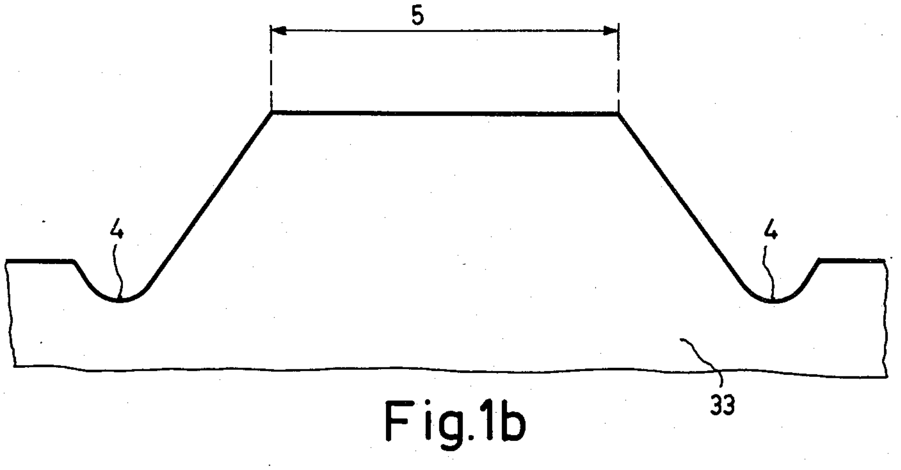
Figure 2A:
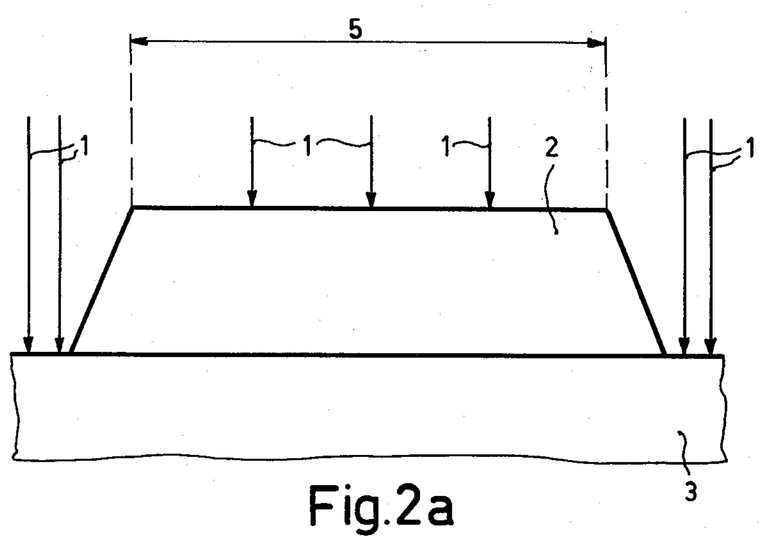
Figure 2B:
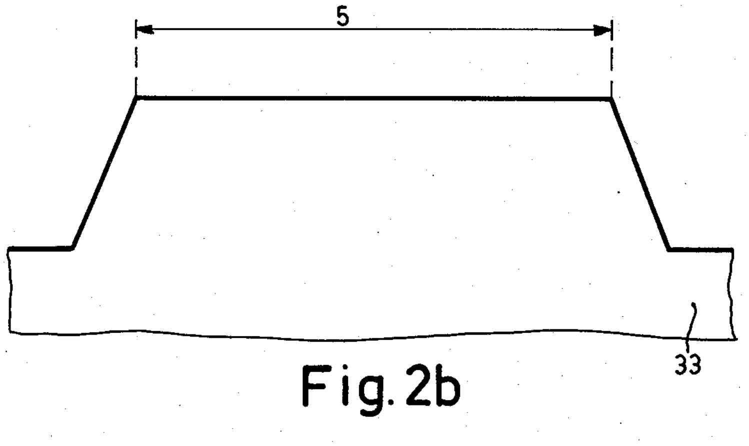
Figure 3A:
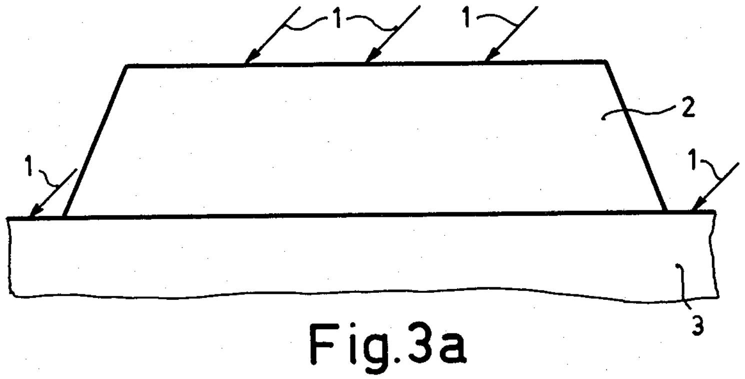
Figure 3B:
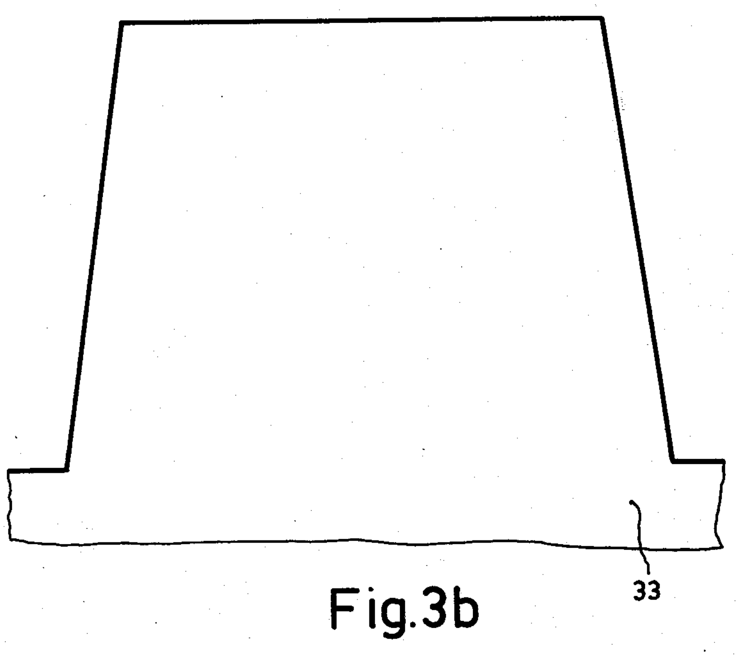

The invention will now be described in greater detail with reference to the accompanying drawing, in which:

FIG. 1*a* shows an etching mask of a material having an etching velocity which depends upon the direction of incidence of the ion beam on a substrate to be etched according to the prior art, FIG. 1*b* shows the structure of the etched substrate after removing the etching mask shown in FIG. 1*a*, FIG. 2*a* shows an etching mask according to the invention which consists of titanium or aluminium oxide on a substrate to be etched (ion beam incident at right angles), FIG. 2*b* shows the structure of the etched substrate after removing the etching mask shown in FIG. 2*a*, FIG. 3*a* shows an etching mask according to the invention which consists of titanium or aluminium oxide on a substrate to be etched (ion beam incident at an angle), and FIG. 3*b* shows the structure of the etched substrate after removing the etching mask shown in FIG. 3*a*.

The considerable increase of the yield (removed particles per incident ion) observed in many materials, including photolacquer masks, when the angle of the ion beam with the normal of the surface increases, results in characteristic changes of the etched structure relative to the etching mask as is shown in FIGS. 1*a* and 1*b*. A considerable inhomogeneity of the etching velocity in the vicinity of the edges may be observed, which is expressed in the formation of pits 4, the depth of said pits increasing when the edge angle of the etching mask increases. Moreover, a considerable shrinkage of the profile width 5 of the etched structure relative to the original profile width 5 of the etching mask 2 may be established. This effect is caused in the first instance in that the ions 1 incident on the inclined edges of the etching mask 2 (see dot A in FIG. 1*a*) have a considerably larger etching velocity than ions 1 which are incident at right angles (see dot B in FIG. 1*a*).

The undesired changes of the etched structure relative to the original structure of the etching mask shown with reference to FIGS. 1*a* and 1*b* do not occur when an etching mask of titanium or of aluminium oxide is used, since in these two materials the yield of particles removed by sputtering depends to a small extent on the angle of incidence of the ions and moreover the etching velocity is small.

The conditions when using a mask of either of these two materials are shown in FIGS. 2*a*, 2*b* and 3*a*, 3*b*.

FIG. 2*a* shows an etching mask of titanium or of aluminium oxide which covers a substrate 3 of $SiO_2$. The ion beam 1 is directed at right angles to the surfaces of the etching mask 2 and of the substrate 3 to be removed. FIG. 2*b* shows the etched substrate 33; the inhomogeneity of the etching velocity in the vicinity of the edges which occurs in an etching mask having an etching velocity which depends upon the direction of incidence of the ion beam (see FIGS. 1*a* and 1*b*) cannot be established; the original profile width 5 of the etching mask 2 in the etched substrate 33 is also maintained. The angle of inclination of the edges of the etching mask is reproduced identically in the etched substrate 33.

When in its turn the yield of particles removed by sputtering in the material to be etched depends considerably upon the direction of incidence of the ions, which usually is the case, the etching process must be carried out with ions incident at an angle, since (with ion density maintained constant) the etching velocity for the material to be etched increases, while said velocity remains constant for the mask material, for example, titanium or aluminium oxide.

FIGS. 3*a* and 3*b* show how under the influence of an ion beam 1 which is incident at an angle and of a consequently increased etching velocity for materials; having an etching velocity which is dependent upon the direction of incidence of the ion beam, structures can be etched which are considerably deeper than the layer thickness of the etching mask. The etching mask 2 of titanium or aluminium oxide shown in FIG. 3*a* after etching with an ion beam 1 which is incident at an angle has resulted in an etched structure (compare the etched substrate 33 in FIG. 3*b*) in the substrate 3 to be etched, with an ion density maintained constant, which has a much larger profile depth than the layer thickness of the original etching mask.

The use of the above-described etching mask of titanium or aluminium oxide enables the etching of micro structures with depths of 1 μm and more.

The etching mask may be provided on the substrate to be etched by cathode sputtering. This applies to a mask of titanium. For providing an etching mask of aluminium oxide, first an aluminium layer is provided by cathode sputtering, after which said aluminium layer is oxidized electrochemically (anodically) after the formation of corresponding contact zones.

What is claimed is:

1. A method of manufacturing in substrates and by means of ion etching via an etching mask, an etched structure having an inclined edge profile, said method comprising the steps of providing on said substrate said etching mask that is characterized by a substantially homogeneous yield of particles removed therefrom in response to said ion etching regardless of the direction of incidence of said ion beam on said mask, adjusting at least one of the layer thickness of said etching mask and the angle of incidence of the ion beam so as to etch said substrate to a desired depth, and directing said ion beam onto said substrate and mask assembly.

2. A method as in claim 1, wherein said mask is selected from the group which consists essentially of titanium and aluminum oxide.

3. A method as in claim 2, wherein said etching mask is aluminium oxide which is obtained by providing by cathode sputtering an aluminum layer on said substrate to be etched and then electrochemically oxidizing said layer.

4. A method as in claim 1, wherein said ion beam is directed at right angles to said substrate to be etched.

5. A method as in claim 1, wherein said ion beam is directed on said substrate to be etched at an angle normal with the surface of said substrate.

6. A method as in claim 1, wherein said substrate is etched to a depth of at least 1 micron.

7. A method as in claim 1, wherein said etching mask is provided on said substrate by cathode sputtering.

* * * * *